United States Patent
Fu et al.

(10) Patent No.: US 9,267,831 B2
(45) Date of Patent: Feb. 23, 2016

(54) SYSTEMS AND METHODS FOR DETERMINING A REAL TIME SOLID FLOW RATE IN A SOLID-GAS MIXTURE

(75) Inventors: Xu Fu, ShangHai (CN); Baoming Huang, Shanghai (CN); Yao Chen, Shanghai (CN); Tong Zhao, Shanghai (CN); Zili Cai, Shanghai (CN); Zhongzhi Hu, Shanghai (CN)

(73) Assignee: General Electric Company, Schenectady, NY (US)

(*) Notice: Subject to any disclaimer, the term of this patent is extended or adjusted under 35 U.S.C. 154(b) by 769 days.

(21) Appl. No.: 13/575,811

(22) PCT Filed: Jan. 6, 2011

(86) PCT No.: PCT/US2011/020379
§ 371 (c)(1),
(2), (4) Date: Oct. 22, 2012

(87) PCT Pub. No.: WO2011/094042
PCT Pub. Date: Aug. 4, 2011

(65) Prior Publication Data
US 2013/0204547 A1    Aug. 8, 2013

(51) Int. Cl.
*G01F 1/86* (2006.01)
*G01F 1/74* (2006.01)

(52) U.S. Cl.
CPC ... *G01F 1/86* (2013.01); *G01F 1/74* (2013.01)

(58) Field of Classification Search
CPC .............. G01F 1/74; G01F 1/86; G01F 1/88; G01F 1/76; G01F 1/00; G01F 3/00; G01F 5/00; G01F 5/005; G01F 7/00; G01F 7/005
See application file for complete search history.

(56) References Cited

U.S. PATENT DOCUMENTS

| | | | |
|---|---|---|---|
| 3,946,605 | A | 3/1976 | Yamazaki et al. |
| 4,506,541 | A | 3/1985 | Cunningham |
| 6,176,647 | B1 | 1/2001 | Itoh |
| 6,973,375 | B2 | 12/2005 | Brodeur et al. |

(Continued)

FOREIGN PATENT DOCUMENTS

| | | |
|---|---|---|
| CN | 1375687 A | 10/2002 |
| CN | 101464172 A | 6/2009 |

(Continued)

OTHER PUBLICATIONS

Wolfgang Birk, Pressure and Flow Control of a Pulverized Coal Injection Vessel, Feb. 1997, Master's Thesis, Lulea University of Technology, 75 pp.*

(Continued)

*Primary Examiner* — Toan Le
(74) *Attorney, Agent, or Firm* — GE Global Patent Operation; Peter T. DiMauro

(57) ABSTRACT

A system for determining a real time solid flow rate of a solid-gas mixture is provided. The system includes multiple sensors, a data-fusion unit and an estimating unit. The sensors generate multiple measurement signals for obtaining at least two measured values of the real time solid flow rate. The data-fusion unit receives the measured values and establishes a state-space model based on the measured values. The estimating unit estimates the state-space model to generate an estimated value of the real time solid flow rate. A method for determining a real time solid flow rate of a solid-gas mixture is also presented.

20 Claims, 4 Drawing Sheets

(56) References Cited

U.S. PATENT DOCUMENTS

| | | | |
|---|---|---|---|
| 7,526,966 | B2 | 5/2009 | Gysling et al. |
| 2005/0043905 | A1 | 2/2005 | Vary |

FOREIGN PATENT DOCUMENTS

| | | | |
|---|---|---|---|
| DE | 4135071 | A1 | 4/1993 |
| EP | 0330262 | A2 | 2/1989 |
| EP | 0378396 | A2 | 1/1990 |
| EP | 0446520 | B1 | 11/1990 |
| EP | 0499759 | A1 | 2/1991 |
| EP | 0454230 | B1 | 4/1991 |
| JP | 63044126 | A | 2/1988 |
| SE | 7414401 | A | 5/1975 |
| WO | WO2004065912 | A2 | 8/2004 |
| WO | WO2008020762 | A1 | 2/2008 |

OTHER PUBLICATIONS

Arild Saether: :Master thesis: Control system for mass flow rate of solids in pneumatic conveying Jun. 6, 2008, Telemark University College, Porsgrunn (Norway).
Di Ruscio: "Subspace System Identification of the Kalman filter", Modeling, Identification and Control, vol. 24, No. 3, Dec. 31, 2003.
International Search Report Jun. 7, 2011 which was issued in connection with the PCT Application No. PCT/US11/20379 which was filed on Jan. 6, 2011.
Unofficial English Translation of Chinese Office Action issued in connection with corresponding CN Application No. 201010105037.2 on Jul. 18, 2012.

* cited by examiner

US 9,267,831 B2

SYSTEMS AND METHODS FOR DETERMINING A REAL TIME SOLID FLOW RATE IN A SOLID-GAS MIXTURE

CROSS REFERENCE TO RELATED APPLICATIONS

This is a national stage application under 35 U.S.C. §371 (c) of prior-filed, co-pending PCT patent application Ser. No. PCT/US2011/020379, filed on Jan. 06, 2011, which claims priority to Chinese Patent Application Ser. No. 201010105037.2, filed on Jan. 29, 2010, the entire contents of which are incorporated herein by reference.

BACKGROUND

Pneumatic conveying systems refer to the systems for transportation of pulverized solid particles carried by a fluid gas forming a solid-gas mixture from one vessel to another vessel through a pipeline or multiple pipelines. The pneumatic conveying systems have been widely used in various industrial fields such as IGCC (Integrated Gasification Combined Cycle) plants for generating electricity and chemical plants for producing chemicals.

In the pneumatic conveying systems, it is typically necessary to measure the real time solid mass flow rate (shortened as "solid flow rate" hereinafter) for controlling and monitoring purpose. The real time solid flow rate is generally defined as the quantity of mass of solid particles that flow through the cross sectional area of a conveying pipeline of the pneumatic conveying systems per time unit. Currently, there are many ways for determining the real time solid flow rate. One conventional process uses a solid flow rate sensor to directly measure and output the real time solid flow rate. Another process uses multiple sensors that together determine the real time solid flow rate. Some of the multiples sensors are firstly used to determine a mixture flow rate of the solid-gas mixture, and the others are used to determine a gas flow rate. The real time solid flow rate is obtained by subtracting the gas flow rate from the mixture flow rate.

However, during both of these conventional ways for determining the real time solid flow rate, only one measured value of the real time solid flow rate is obtained. As a result, it is very difficult to achieve a reliable real time solid flow rate if any of the sensors is broken or not working properly. Therefore, there is a need to provide improved systems and methods for a reliable real time solid flow rate measurement.

BRIEF DESCRIPTION

In accordance with one embodiment, a system for determining a real time solid flow rate of a solid-gas mixture comprises a plurality of sensors, a data-fusion unit and an estimating unit. The sensors generate a plurality of measurement signals for obtaining at least two measured values of the real time solid flow rate. The data-fusion unit receives the measured values and establishes a state-space model based on the measured values. The estimating unit estimates the state-space model to generate an estimated value of the real time solid flow rate.

In accordance with another embodiment, a system for determining a real time solid flow rate of a solid-gas mixture comprises a plurality of sensors, a calculating unit, a data-fusion unit, and an estimating unit. The sensors generate a plurality of measurement signals that are indicative of characteristics of the solid-gas mixture. The calculating unit receives the measurement signals and generates at least two different measured values of the real time solid flow rate. The data-fusion unit receives the measured values and establishes a state-space model based on the measured values. The estimating unit estimates the state-space model and generates an estimated value of the real time solid flow rate.

In accordance with another embodiment, a method for determining a real time solid flow rate of a solid-gas mixture comprises: generating a plurality of measurement signals signifying characteristics of the solid-gas mixture by a plurality of sensors; providing at least two measured values of the solid flow rate based on the measurement signals; establishing a state-space model based on the measured values; and estimating the state-space model to output an estimated value of solid flow rate.

These and other advantages and features will be better understood from the following detailed description of embodiments of the present invention that are provided in connection with the accompanying drawings.

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

The present system generally relates to a measurement technology in pneumatic conveying systems, and more particularly to systems and methods for determining a real time solid flow rate in a solid-gas mixture conveyed by the pneumatic conveying systems.

Figure 1:
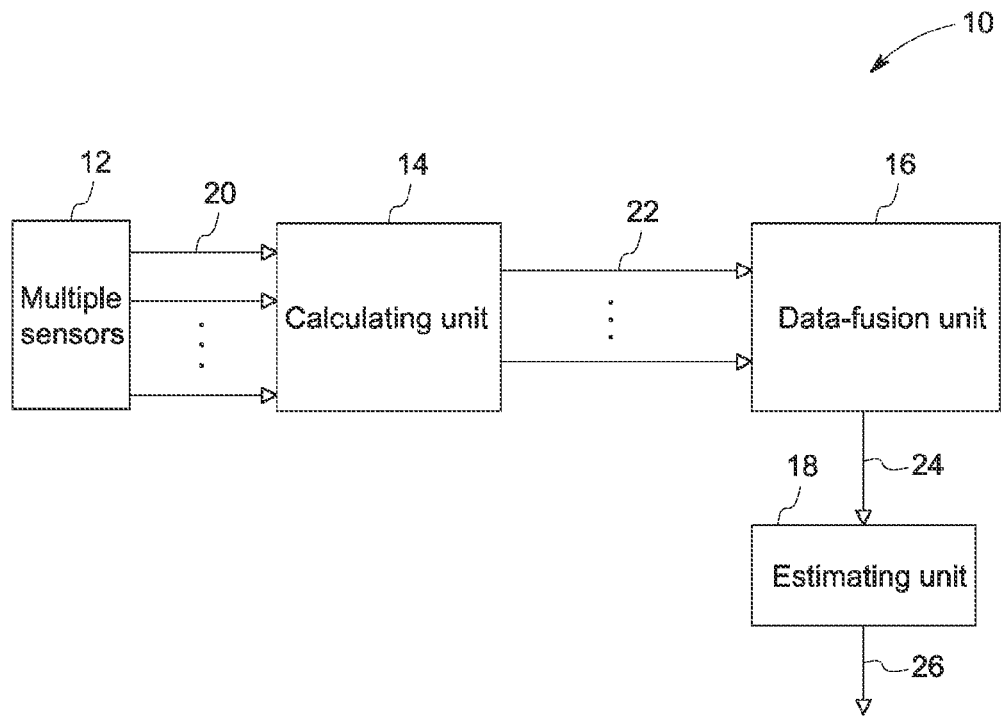
FIG. 1 is a schematic block diagram illustrating a system for determining a real time solid flow rate in a solid-gas mixture in accordance with one embodiment.

FIG. 1 shows a system 10 for determining a real time solid flow rate in a solid-gas mixture in accordance with one embodiment of the present system. The system 10 includes multiple sensors 12, a calculating unit 14, a data-fusion unit 16 and an estimating unit 18. The term "sensor" includes but is not limited to sensing elements, meters, or any measurement devices that can measure temperature, gauge pressure, weight or other characteristics of an object and generate measurement signals for outputting the characteristics.

The multiple sensors 12 are used for measuring various characteristics of the solid-gas mixture and outputting a plurality of measurement signals 20 indicative of the characteristics. The calculating unit 14 receives the measurement signals 20 and produces a plurality of different solid flow rates, which are defined as measured values 22 of the real time solid flow rate, based on the received measurement signals 20. The data-fusion unit 16 receives the measured values 22 and establishes a state-space model 24 based on the measured values 22. Finally, the estimating unit 18 estimates the state-space model 24 to produce an estimated value 26 of the real time solid flow rate according to a predetermined estimating algorithm.

Figure 2:
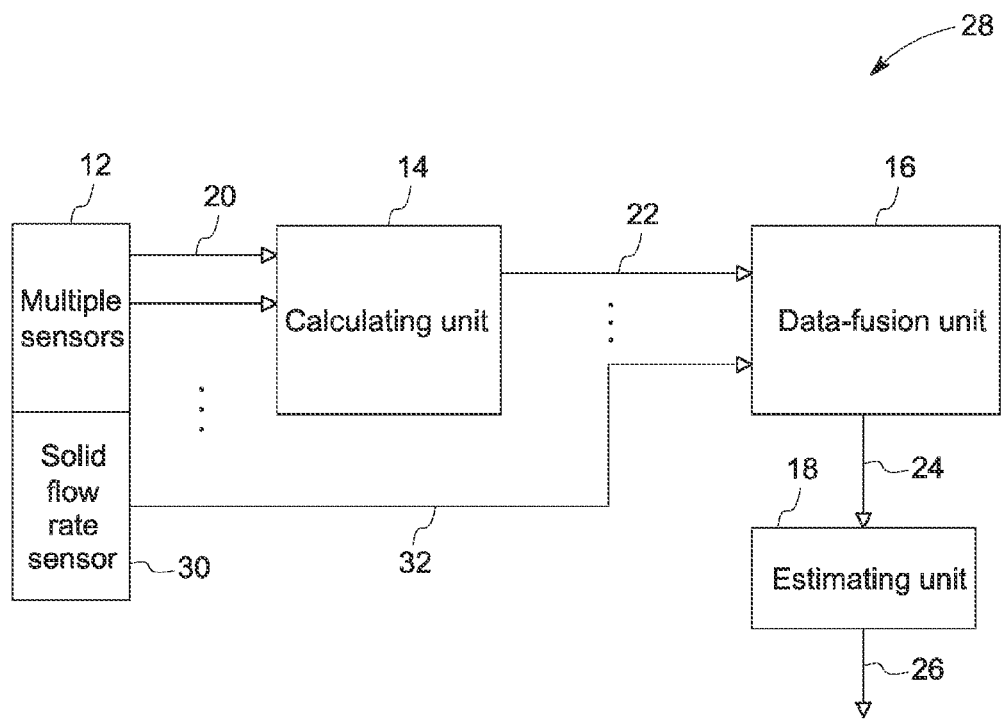
FIG. 2 is a schematic block diagram illustrating a system for determining a real time solid flow rate in a solid-gas mixture in accordance with another embodiment.

FIG. 2 illustrates a system 28 in accordance with another embodiment. The system 28 has a similar configuration of the other system 10. One difference is that the multiple sensors 12 include at least one solid flow rate sensor 30 that directly outputs a measured value 32 of the real time solid flow rate. The measured value 32 avoids the calculating unit 14 and directly enters into the data-fusion unit 16. In one embodiment, the measured value 32 enters into the calculating unit 14 firstly as shown in FIG. 1. However, there is no essential calculation applied on the measured value 32 in the calculating unit 14. Then, the measured value 32 comes out of the calculating unit 14 and becomes one input of the data-fusion unit 16.

It can be understood that the sensors generally generate analog signals that are converted into digital signals before being used for calculation or data-fusion, though it is not specially mentioned in the foregoing and following embodiments.

Figure 3:
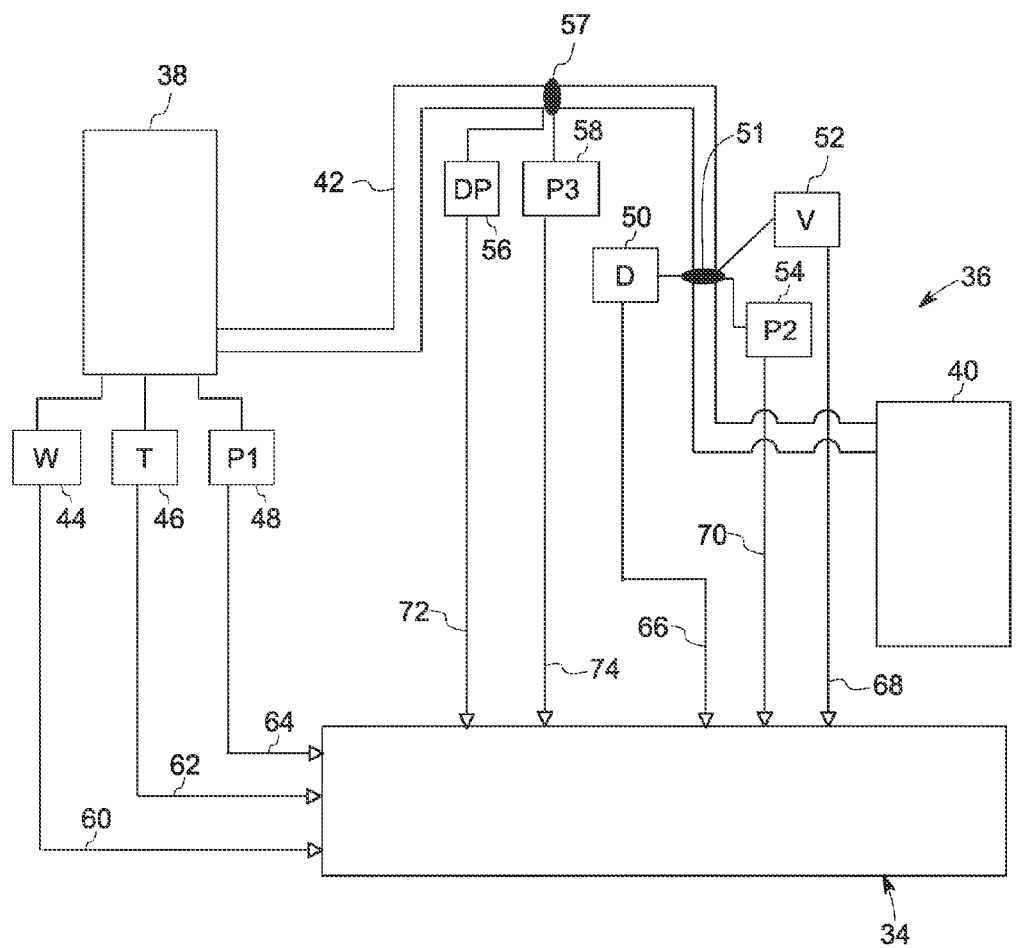
FIG. 3 is a schematic diagram illustrating connections between a system for determining a real time solid flow rate in a solid-gas mixture in accordance with still another embodiment and a pneumatic conveying system for conveying the solid-gas mixture.

Referring to FIG. 3, a pneumatic conveying system 36 in accordance with another embodiment is used for determining a real time solid flow rate in a solid-gas mixture. The pneumatic conveying system 36 includes a sending vessel 38, a receiving vessel 40 and a pipeline 42 connecting the sending vessel 38 with the receiving vessel 40. The solid-gas mixture is conveyed through the pipeline 42. In one embodiment, the solid-gas mixture is conveyed through several pipelines simultaneously. The pneumatic conveying system could be used in various industrial fields. For example, the pneumatic conveying system in one application is a dry feed gasification system in an IGCC plant. For the dry feed gasification system, the sending vessel 38 is a storing tank for storing a coal-nitrogen mixture and the receiving vessel 40 is a gasifier.

As shown in FIG. 3, the system 36 in this example has eight sensors that are divided into three groups. The first group includes a weight sensor (W) 44, a temperature sensor (T) 46 and a first gauge pressure sensor (P1) 48. The weight sensor 44 is installed to a bottom surface of the sending vessel 38, while the temperature sensor 46 and the first gauge pressure sensor 48 both are installed at a top surface of the sending vessel 38. In one embodiment, the temperature sensor 46 and the first gauge pressure sensor 48 are also installed in the bottom surface of the sending vessel 38, as shown in FIG. 3. The weight sensor 44 generates a weight signal 60 indicating the weight of the solid-gas mixture in the sending vessel 38. The temperature sensor 46 generates a temperature signal 62 indicating the temperature of solid-gas mixture in the sending vessel 38. The first gauge pressure sensor 48 generates a first pressure signal 64 indicating the gauge pressure of the solid-gas mixture in the sending vessel 38.

The second group includes a density sensor (D) 50 based on gamma-ray technology, a solid velocity sensor (V) 52 and a second gauge pressure sensor (P2) 54, all of which are installed to a vertical section 51 of the pipeline 42 for measuring different characteristics in the same point. The density sensor 50 generates a density signal 66 indicating the density of the solid-gas mixture at the vertical section 51. The solid velocity sensor 52 generates a solid velocity signal 68 indicating the velocity of the solid in the solid-gas mixture at the vertical section 51. The second gauge pressure sensor 54 generates a second pressure signal 70 indicating the gauge pressure at the vertical section 51.

The third group includes a differential pressure sensor (DP) 56 and a third gauge pressure sensor (P3) 58. The differential pressure sensor 56 generates a pressure difference signal 72 showing the pressure drop along the pipeline 42 between two measuring points (not shown). The third gauge pressure sensor 58 is installed on a horizontal section 57 of the pipeline 42 that is located between the two measuring points of the differential pressure sensor 56. The third gauge pressure sensor 58 generates a third pressure signal 74 showing the gauge pressure at the horizontal section 57.

It should be understood that there can be a multitude of sensor groups and corresponding sensors including various forms of sensors. The various sensor measurement signals 60, 62, 64, 72, 74, 66, 70, 68 are communicated to a calculating system 34 that processes the sensor measurements. The calculating system 34 in one example processes a real time solid flow rate in a solid-gas mixture. The sensor measurement signals 60, 62, 64, 72, 74, 66, 70, 68 can be hardwired to the calculating system 34 or coupled to a transmitter or transceiver for communicating the sensor data.

According to one embodiment, the calculating system 34 includes one or more computing devices such as a processors or microprocessors that can include or be coupled to a computer readable storage medium containing software for executing computer software. The computer readable storage medium in one example is physical memory storage such as a drive, disk, RAM, ROM, or other physical storage device.

Figure 4:
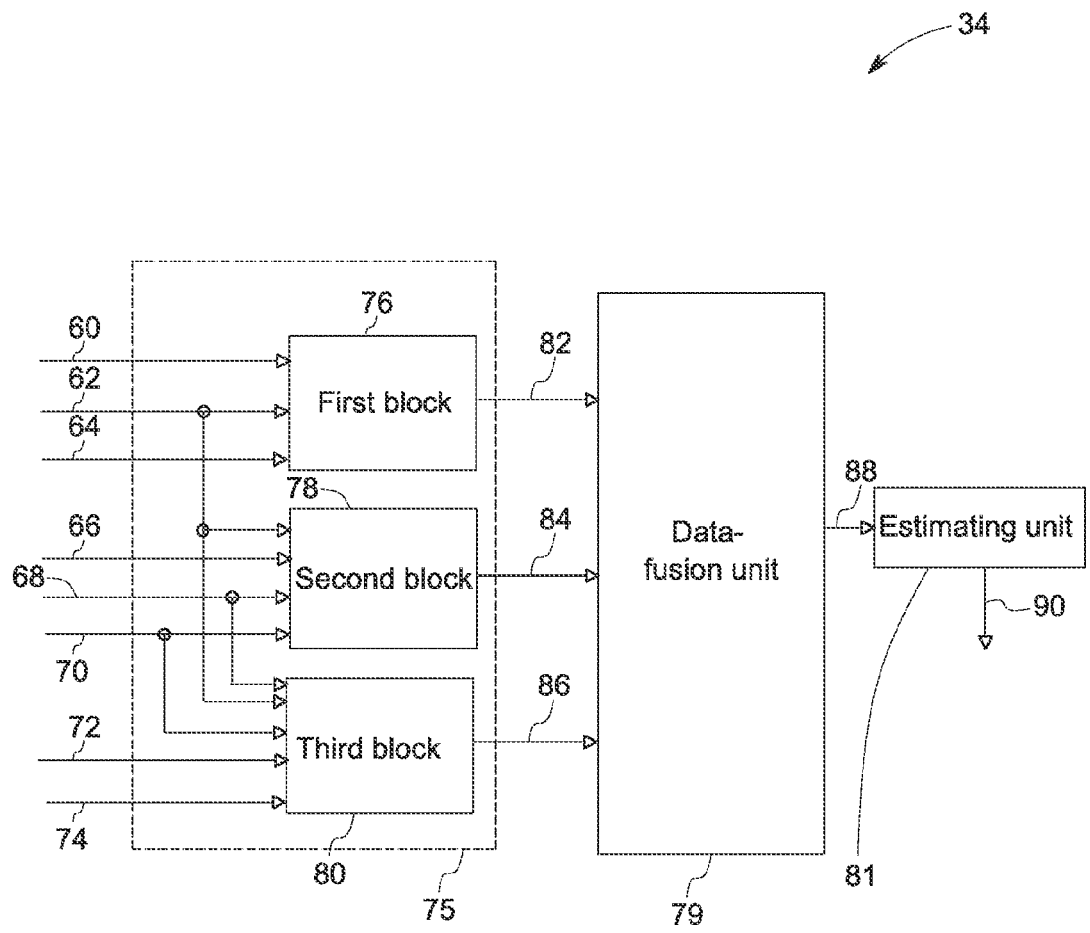
FIG. 4 is a schematic block diagram illustrating the system for determining a real time solid flow rate in a solid-gas mixture of FIG. 3.

FIG. 4 illustrates a further configuration of the calculating system 34. The calculating system 34 is divided into a calculating unit 75, a data-fusion unit 79 and an estimating unit 81. Sensors (not shown) generate the sensor measurement signals such as 60, 62, 64, 66, 68, 70, 72 and 74, and communicate with the calculating unit 75.

The calculating unit 75 includes three (first, second and third) blocks 76, 78 and 80 for producing three (first, second and third) measured values 82, 84 and 86 of the solid flow rate based on the sensor measurement signals 60, 62, 64, 66, 68, 70, 72, and 74 from sensors (not shown).

Referring again to FIG. 4, the first block 76 receives the weight signal 60, the temperature signal 62 and the first pressure signal 64 and calculates the solid weight in the sending vessel 38 at a certain time based on these received measurement signals 60, 62 and 64. Then, the first block 76 calculates the first measured value 82 based on the loss in the solid weight over a certain time period. The detailed steps of the calculation are illustrated as follows.

Referring to FIGS. 3 and 4, a solid volume of the solid-gas mixture in the sending vessel 38 is calculated based on the weight signal 60, the temperature signal 62 and the first pressure signal 64. Assume that the internal volume of the sending vessel 38, a solid volume in the sending vessel 38 and a gas volume of the sending vessel 38 are respectively $V_{sending}$ (m$^3$), $V_{solid, sending}$ (m$^3$) and $V_{gas, sending}$ (m$^3$), whose relationship is shown as the equation (1):

$$V_{solid, sending} + V_{gas, sending} = V_{sending} \tag{1}$$

Assume that a solid density and a gas density at current pressure and temperature in the sending vessel 38 are $\rho_{coal}$ (Kg/m$^3$) and $\rho_{gas, sending}$ (Kg/m$^3$) respectively. A weight of the solid-gas mixture (mixture weight) is represented by the equation (2):

$$V_{solid, sending} \cdot \rho_{solid} + V_{gas, sending} \cdot \rho_{gas, sending} = W_{sending} \tag{2}$$

wherein, $W_{sending}$ (Kg) is the mixture weight acquired from the weight signal 60; $\rho_{coal}$ is the solid density which is known from the superficial density of the solid having a fixed value for a certain solid sample; and $\rho_{gas, sending}$ can be calculated according to the known ideal gas equation based on the temperature signal 62 and the first pressure signal 64. The ideal gas equation is given by equation (3):

$$\rho_{gas,sending}(Kg/m^3) = \frac{(P_1 + P_0) \cdot \rho_{gas,0} \cdot T_0}{P_0 \cdot (T_0 + T_{sending})} \quad (3)$$

wherein, $T_{sending}$ and $P_1$ are the temperature and the gauge pressure in the sending vessel 38, respectively, acquired from the temperature signal 62 and the first pressure signal 64; $P_0$ is the pressure at the standard condition, 0.101325 Mpa; $T_0$ is the temperature at the standard condition, 273.15K(Kelvin temperature), and $\rho_{gas,\ 0}$ is the gas density at the standard condition, which can be looked up from known density map or obtained by other ways. In one embodiment, the gas in the solid-gas mixture is nitrogen, thus $\rho_{gas,\ 0}$ is 1.2504 Kg/m³. Therefore, the solid volume, $V_{solid,\ sending}$, is determined based on the equations (2) and (3).

A solid weight, $W_{solid,\ sending}$ is given by the solid volume, $V_{solid,\ sending}$, multiplying the solid density. Then, the first measured value 82 is calculated from the loss of the solid weight per time unit, which is represented by equation (4):

$$G_{s,WC}(Kg/s) = \frac{\Delta W_{solid,sending}}{\Delta t} \quad (4)$$

wherein, $G_{s,\ WC}$ is the first measured value 82; $\Delta W_{solid,\ sending}$ is the loss of the solid weight for a chosen period, $\Delta t(s)$.

Referring again to FIGS. 3 and 4, the second block 78 receives the density signal 66, the solid velocity signal 68 and the second pressure signal 70. For little energy loss incurred during conveying of the solid-gas mixture, the temperatures of the solid-gas mixture in sending vessel 38 approximately equals to that in pipeline 42. Therefore, the second block 78 could receive the temperature signal 62 rather than install another temperature sensor on the vertical section 51.

Based on the received measurement signals 66, 68, 70 and 62, the second block 78 calculates the second measured value 84 according to the following steps. A gas density in the solid-gas mixture at the vertical section 51 is calculated according to the ideal gas equation (5):

$$\rho_{gas-1}(Kg/m^3) = \frac{(P_2 + P_0) \cdot \rho_{gas,0} \cdot T_0}{P_0 \cdot (T_0 + T_d)} \quad (5)$$

wherein $\rho_{gas-1}$ is the gas density at the vertical section 51; $P_2$ is the second gauge pressure at the vertical section 51 and acquired from the second pressure signal 70; $T_d$ is the temperature at the vertical section 51, and approximately equals to the temperature indicated by the temperature signal $T_{sending}$; and the other parameters $P_0$, $T_0$, and $\rho_{gas,\ 0}$ are known.

Then, a solid volume percentage in the solid-gas mixture is calculated based on the density signal 66 and the gas density $\rho_{gas-1}$, according to the equation (6):

$$V_{solid,gamma-ray}(\%) = \frac{\rho_{mixing-1} - \rho_{gas-1}}{\rho_{solid} - \rho_{gas-1}} \quad (6)$$

wherein, $V_{solid,\ gamma-ray}$ (%) is the solid volume percentage; $\rho_{mixing-1}$ is a mixture density which is acquired from the density signal 66; and $\rho_{solid}$ is the solid density which is known.

Finally, the second measured value 84 is calculated based on the solid volume percentage, $V_{solid,\ gamma-ray}$ (%) of and a solid velocity from the solid velocity signal 68 according to the equation (7):

$$G_{s,SM}(Kg/s) = C_{SM} \cdot V_{solid,gamma-ray}(\%) \cdot \rho_{solid} \frac{1}{4}\pi D_{SM} \cdot v_{solid,EC} \quad (7)$$

wherein, $G_{s,\ SM}$ is the second measured value 84; $C_{SM}$ is the correction coefficient of $G_{s,\ SM}$ which is acquired from experimental data; $D_{SM}$ (m) is the pipeline diameter at the vertical section 51; $v_{solid,\ EC}$ is the solid velocity acquired from the solid velocity signal 68.

In one embodiment, a solid flow rate sensor (not shown) replaces the density sensor 50, the solid velocity sensor 52 and the second gauge pressure sensor 54. Accordingly, the second block 78 is omitted since the solid flow rate sensor can output the second measured value 84 directly without any calculation in the calculating unit 75. In another embodiment, the solid flow rate sensor avoids having the calculating unit 75 to be directly connected with the data-fusion unit 79. The second measured value 84 directly enters into the data-fusion unit 79. The solid flow rate sensor could be based on many technologies such as ultrasonic, capacitance and gamma ray.

The third block 80 receives the solid velocity signal 68, the differential pressure signal 72, the third pressure signal 74 as well as the temperature signal 62 and the second pressure signal 70. The third block 80 calculates the third measured value 86 according to the following steps. A mixture density in the solid-gas mixture at the horizontal section 57 is calculated according to the equation (8):

$$\rho_{mixing-2} = \frac{2 \cdot (\Delta P_h \cdot 1000) \cdot D}{C_f \cdot L \cdot v_{gas}^2} \quad (8)$$

wherein, $\rho_{mixing-2}$ (Kg/m³) is the mixing density of the solid-gas mixture at the horizontal section 57; $\Delta P_h$ (Pa) is the pressure drop along the horizontal pipeline and can be acquired from the differential pressure signal 72; $C_f$ is the coefficient of friction of the solid-gas mixture through the pipeline 42 and can be predetermined from experimental data; L(m) is the length of the section between the two measurement points of the differential pressure sensor 56; D(m) is the pipeline diameter at the horizontal section 57; $v_{gas}$ (m/s) is a gas velocity at the horizontal section 57 and can be calculated by equation (9):

$$v_{gas} = v_{solid,EC}\left(\frac{D_{SM}}{D}\right)^2 \cdot \frac{P_2}{P_3} \quad (9)$$

wherein, $P_2$ and $P_3$ are acquired from the second and third pressure signals 70 and 74 and $v_{solid,\ EC}$ is acquired from the solid velocity signal 68.

Then, a solid volume percentage of in the solid-gas mixture at the horizontal section 57 is calculated based on the mixture density, $\rho_{mixing-2}$, which is represented by the equation (10):

$$V_{solid,DP}(\%) = \frac{\rho_{mixing-2} - \rho_{gas-2}}{\rho_{solid} - \rho_{gas-2}} \quad (10)$$

wherein, $V_{solid, DP}$ is the solid volume percentage in the solid-gas mixture at the horizontal section 57; $\rho_{gas-2}$ (Kg/m³) can be calculated according to the ideal gas equation as:

$$\rho_{gas-2} = \frac{(P_3 + P_0) \cdot \rho_{gas,0} \cdot T_0}{P_0 \cdot (T_0 + T_p)} \quad (11)$$

wherein, $\rho_{gas-2}$ is the gas density in the solid-gas mixture at the horizontal section 57; $T_p$ is the temperature at the horizontal section 57, and approximately equals to the temperature shown by the temperature signal $T_{sending}$; and the other parameters $P_0$, $T_0$, and $\rho_{gas, 0}$ are known.

Finally, the third measured value 86 is calculated based on the solid volume percentage and the solid velocity from the solid velocity signal 68 according to the equation (12) as:

$$G_{s,PDM} (Kg/s) = C_{PDM} \cdot V_{solid,DP}(\%) \cdot \rho_{solid} \frac{1}{4}\pi D_{SM} \cdot v_{solid,EC} \quad (12)$$

wherein, $G_{s, PDM}$ is the third measured value 86 of the solid flow rate; and $C_{PDM}$ is the correction coefficient of the third measured value 86 and acquired from experimental data.

In one embodiment, the differential pressure sensor 56 and the third gauge pressure sensor 58 are installed on a vertical section of the pipeline, such as the vertical section 51 where the density sensor 50 is installed. The difference is that the gravity of the solid-gas mixture should be considered during calculation.

In the next process, the first, second and third measured values 82, 84 and 86 of the solid flow rate functioning are input into the data-fusion unit 79. The data-fusion unit 79 establishes a state-space model according to the following steps.

Figure 5:
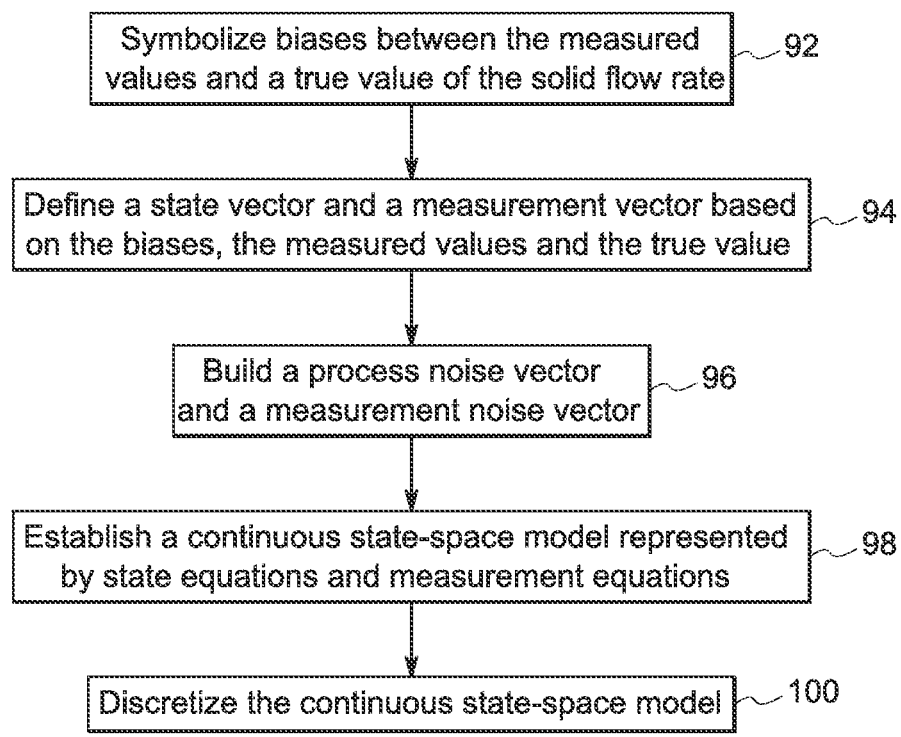
FIG. 5 is a flowchart illustrating a method used in a data-fusion unit of the system of FIG. 4 according to one embodiment.

Referring to FIG. 5, at step 92, biases between the received measured values 82, 84 and 86 and a true value (not labeled) of the solid flow rate are symbolized as $b_{WC}$, $b_{SM}$, $b_{PDM}$.

At step 94, a state vector and a measurement vector are respectively defined based on the biases, the measured values 82, 84 and 86 and the true value, which is represented by equation (13):

$$x=[b_{WC}, b_{SM}, b_{PDM}, G_{s,\ TRUE}]^T \ y=[G_{WC}, G_{SM}, G_{PDM}]^T \quad (13)$$

wherein, $G_{s, TRUE}$ is the true value; $[\ldots]^T$ means transpose of the matrix inside the bracket; x is the state vector that consists of four components (a four-dimensional column vector): three biases and the true value; y is the measurement vector that consists of three components (a three-dimensional column vector): the measured values 82, 84 and 86.

The amount of components is varied with the amount of the received measured values. Therefore, in one embodiment, the state vector at least has three components, and the measurement vector at least has three and two components.

At step 96, a process noise vector and a measurement noise vector are respectively built, which is represented by equation (14)

$$w=[P_{WC-N}, P_{SM-N}, P_{PDM-N}, P_{s,\ TRUE-N}]^T \ v=[M_{WC-N}, M_{SM-N}, M_{PDM-N}]^T \quad (14)$$

wherein, w means the process noise vector which has four components, $P_{WC-N}$, $P_{SM-N}$, $P_{PDM-N}$ and $P_{s,\ TRUE-N}$, respectively indicating the process noise of each component in the state vector; v means the measurement noise vector which has four components, $M_{WC-N}$, $M_{SM-N}$, and $M_{PDM-N}$, respectively indicating the measurement noise of each component in the measurement vector.

At step 98, a continuous state-space model varied with time, t, is established, which is represented by equation (15). The state-space model includes state equations, $\dot{X}(t)$, and measurement equations, $Y(t)$.

$$\dot{X}(t)=Ax(t)+w(t) \ Y(t)=Cx(t)+v(t) \quad (15)$$

wherein, $A=O_{4\times 4}$ is a four-dimensional state matrix; $C=[I_{3\times 3} 1_{3\times 1}]_{3\times 4}$ is an output matrix which is a three-dimensional identity matrix and a three-dimensional identity column vector. It is understood that the dimensions of the state matrix and output matrix are determined by the amount of the measured values of the solid flow rate. Both w(t) and v(t) are white noise that represents the process noise and the measurement noise which are built by equation (14).

At step 100, the continuous state-space model is discretized to become a discrete state-space model 88, which is represented by:

$$\hat{X}(k)=Fx(k-1)+w(k) \ Y(k)=Cx(k)+v(k) \quad (16)$$

wherein, $\hat{X}(t)$ is discrete state equations; $F=e^{A \cdot \Delta T}=I_{4\times 4}$ is a four-dimensional identity matrix, $\Delta T$ is a sample period, in one embodiment, $\Delta T=1$ s; k means sampling time. In the following process, the estimating unit 81 estimates the discrete state-space model 88 to generate an estimated value 90 of the solid flow rate (see FIG. 4).

Although the description about the processes in the data-fusion unit 79 based on the three measured values 82, 84 and 86, the present system is not limited to this manner. In one embodiment, any two of the measured values 82, 84 and 86 function as the input data to the data-fusion unit 79. In another embodiment, the at least two different measured values are determined by solid flow sensors, weight sensors, density sensors, differential pressure sensors or other suitable sensors. In still another embodiment, the at least two different measured values are determined by the same kinds of sensors which are installed on different sections of the pipeline 42 (see FIG. 3). In still another embodiment, the at least two different measured values are determined by two or more groups of sensors which are approximately co-located (installed in the same place of the pneumatic conveying system).

In one system, at least two measured values are used for determining the solid flow rate. Even if one of the sensors breaks down, others sensors still provide at least one measured value for determining the real time solid flow rate, leading to high accuracy and reliability of the measurement result.

Referring again to FIG. 4, in one embodiment, the estimating unit 81 is a Kalman filter that provides efficient recursive algorithm to estimate the discrete state-space model 88. The recursive algorithm means that the estimated value at a current state is from the estimated value at a previous state and current measured values.

In another embodiment, the estimating unit 81 is estimator based on Bayesian networks or Dempster-Shafer.

It should be noted that "a" and "an" used to modify uncountable term herein are intended to specially indicate the term is first mentioned in individual sections rather than limit the term's amount.

While only certain features of the invention have been illustrated and described herein, many modifications and changes will occur to those skilled in the art. It is understood that the appended claims are intended to cover all such modifications and changes as fall within the true spirit of the invention.

What is claimed is:

1. A system for improving the reliability of a dry feed Integrated Gasification Combined Cycle pneumatic conveying system by using a determined real time solid flow rate of a solid-gas mixture, comprising:
    a plurality of sensors generating a plurality of measurement signals for obtaining at least three measured values of the real time solid flow rate;
    a data-fusion unit receiving the measured values and establishing a state-space model based on the measured values wherein said measured values comprise three blocks for respectively calculating the measured values, wherein a first measured value is calculated from the loss of solid weight per time unit; a second measured value is calculated based on solid volume percentage and solid velocity and a third measured value is calculated based on solid volume percentage and solid velocity and a differential pressure indicative of a pressure drop along a pipeline between two measuring points;
    an estimating unit estimating the state-space model to generate an estimated value of the real time solid flow rate; and
    improving the reliability of a dry feed Integrated Gasification Combined Cycle pneumatic conveying system by monitoring the calculated estimated real time solid flow rate and controlling the solid flow rate inputs.

2. The system of claim 1, further comprising a calculating unit that receives the measurement signals from the sensors to generate at least one of the measured values.

3. The system of claim 2, wherein the sensors comprises a weight sensor which is installed on a sending vessel for storing the solid-gas mixture to measure a mixture weight of the solid-gas mixture; and wherein at least one of measured values is acquired based on the measurement signal generated by the weight sensor.

4. The system of claim 3, wherein the sensors further comprises a temperature sensor and a gauge pressure sensor which are installed on the sending vessel; and wherein the one of measured values is acquired from solid weight loss per time unit which is calculated based on the measurement signals generated by the temperature sensor and a gauge pressure as well as the weight sensor.

5. The system of claim 2, wherein the sensors comprises a differential pressure sensor that is installed on a pipeline for conveying the solid-gas mixture; and wherein the one of the measured values is acquired based on the measurement signal generated by the differential pressure sensor.

6. The system of claim 1, wherein the at least two measured values are acquired based on the sensors which are approximately co-located.

7. The system of claim 1, wherein the sensors comprise a solid flow rate sensor; and wherein at least one of the measured values is acquired from the solid flow rate sensor.

8. The system of claim 1, wherein the state-space model comprises a state vector consisting of the measured values and a true value of the real time solid flow rate; and a measurement vector consisting of the measured values.

9. The system of claim 1, wherein the estimating unit is a Kalman filter.

10. A system for improving the reliability of a dry feed Integrated Gasification Combined Cycle pneumatic conveying system by using a determined real time solid flow rate of a solid-gas mixture, comprising:
    a plurality of sensors generating a plurality of measurement signals which are indicative of characteristics of the solid-gas mixture;
    a calculating unit receiving the measurement signals and generating at least three different measured values of the real time solid flow rate comprising three blocks for respectively calculating the measured values, wherein a first measured value is calculated from the loss of solid weight per time unit; a second measured value is calculated based on solid volume percentage and solid velocity and a third measured value is calculated based on solid volume percentage and solid velocity and a differential pressure indicative of a pressure drop along a pipeline between two measuring points;
    a data-fusion unit receiving the measured values and establishing a state-space model based on the measured values;
    an estimating unit estimating the state-space model and generating an estimated value of the real time solid flow rate; and
    improving the reliability of a dry feed Integrated Gasification Combined Cycle pneumatic conveying system by monitoring the calculated estimated real time solid flow rate and controlling the solid flow rate inputs.

11. The system of claim 10, wherein at least one measurement signal is used for providing two or more measured values.

12. The system of claim 10, wherein the calculating unit comprises at least two blocks for respectively calculating the measured values.

13. A method for improving the efficiency of a dry feed Integrated Gasification Combined Cycle pneumatic conveying system by using a determined real time solid flow rate of a solid-gas mixture, comprising:
    generating a plurality of measurement signals signifying characteristics of the solid-gas mixture by a plurality of sensors;
    providing at least three measured values of the solid flow rate based on the measurements signals;
    establishing a state-space model based on the measured values, wherein said measured values comprise three blocks for respectively calculating the measured values, wherein a first measured value is calculated from the loss of solid weight per time unit, a second measured value is calculated based on solid volume percentage and solid velocity and a third measured value is calculated based on solid volume percentage and solid velocity and a differential pressure indicative of a pressure drop along a pipeline between two measuring points;
    estimating the state-space model to output an estimated value of solid flow rate; and
    improving the reliability of a dry feed Integrated Gasification Combined Cycle pneumatic conveying system by monitoring the calculated estimated real time solid flow rate and controlling the solid flow rate inputs.

14. The method of claim 13, wherein the step of generating a plurality of measurement signals signifying characteristics of the solid-gas mixture by a plurality of sensors, comprises the steps of:
    generating a partial of the measurement signals signifying the characteristics of the solid-gas mixture stored in a sending vessel;
    generating another partial of the measurement signals signifying the characteristics of the solid-gas mixture conveyed in a pipeline.

15. The method of claim 14, wherein the step of providing at least two measured values of the solid flow rate based on the measurement signals, comprises the steps of:
    calculating a solid volume in the sending vessel based on the measurement signals generated by a weight sensor, a temperature sensor and a gauge pressure sensor which are the sensors installed on the sending vessel;

calculating a solid weight in the sending vessel; and calculating solid weight loss per time unit based on the solid volume and the solid weight to provide one of the measured values.

16. The method of claim 14, wherein the step of providing at least two measured values of the solid flow rate based on the measurement signals, comprises the steps of:

calculating a solid volume percentage in the solid-gas mixture based on the measurement signals generated by a density sensor and a gauge pressure sensor which are installed in the same place of the pipeline; and calculating one of the measured values based on the solid volume percentage and a measurement signal generated by a solid velocity sensor installed on the same place as the density sensor.

17. The method of claim 13, wherein the step of providing at least two measured values of the solid flow rate based on the measurement signals, comprises the steps of:

calculating a mixture density of the solid-gas mixture based on the measurement signals generated by a differential pressure measurement signal and a gauge pressure sensor which are installed on the same place on the pipeline;

calculating a solid volume percentage of the solid-gas mixture based on the mixture density; and calculating one of the measured values based on the solid volume percentage.

18. The method of claim 13, wherein the step of providing at least two measured values of the solid flow rate based on the measurement signals, comprises directly measuring at least one of the measured values by a solid flow rate sensor.

19. The method of claim 13, wherein the step of establishing a state-space model based on the measured values, comprises the steps of:

defining a state vector and a measurement vector; the state vector consisting of a true value of the real time solid flow rate and biases between the measured values and the true value; the measurement consisting of the measured values;

building a process noise vector and a measurement noise vector;

establishing a continuous state-space model according to the state vector and the measurement vector with the process noise and the measurement noise vector; and discretizing the continuous state-space model to establish the state-space model.

20. The method of claim 13, wherein using a Kalman filter to implement the step of estimating the state vector to output an estimated value of solid flow rate.

* * * * *